US009352827B2

(12) United States Patent
Besliu

(10) Patent No.: US 9,352,827 B2
(45) Date of Patent: May 31, 2016

(54) HYDRAULIC SHIMMY DAMPER FOR AIRCRAFT LANDING GEAR

(75) Inventor: Marin Besliu, Mississauga (CA)

(73) Assignee: Messier-Dowty Inc., Ontario (CA)

( * ) Notice: Subject to any disclaimer, the term of this patent is extended or adjusted under 35 U.S.C. 154(b) by 306 days.

(21) Appl. No.: 13/813,048

(22) PCT Filed: Jul. 28, 2011

(86) PCT No.: PCT/CA2011/050464
§ 371 (c)(1),
(2), (4) Date: Apr. 9, 2013

(87) PCT Pub. No.: WO2012/012904
PCT Pub. Date: Feb. 2, 2012

(65) Prior Publication Data

US 2013/0207327 A1 Aug. 15, 2013

(30) Foreign Application Priority Data

Jul. 29, 2010 (CA) ..................................... 2711199

(51) Int. Cl.
*B64C 25/50* (2006.01)
*F16F 9/32* (2006.01)
*F16F 9/06* (2006.01)
*F16F 13/00* (2006.01)

(52) U.S. Cl.
CPC ............... *B64C 25/505* (2013.01); *F16F 9/065* (2013.01); *F16F 9/325* (2013.01); *F16F 13/007* (2013.01)

(58) Field of Classification Search
CPC ...... B64C 25/505; F16F 13/007; F16F 9/065; F16F 9/325
USPC .......... 188/313, 314; 280/86.1; 16/51, 56, 57, 16/58
See application file for complete search history.

(56) References Cited

U.S. PATENT DOCUMENTS 4,351,515 A * 9/1982 Yoshida ........................ 267/225
6,135,735 A * 10/2000 Siegel ........................... 417/568
6,213,261 B1 * 4/2001 Kunkel ......................... 188/314
6,443,272 B1 * 9/2002 Rottenberger et al. .... 188/319.2
6,630,761 B1 10/2003 Gabrys
7,445,094 B1 * 11/2008 Henderson et al. ........... 188/267

(Continued)

FOREIGN PATENT DOCUMENTS

JP 2008-143355 A 6/2008

*Primary Examiner* — Robert A Siconolfi
*Assistant Examiner* — Charles Poon
(74) *Attorney, Agent, or Firm* — Sughrue Mion, PLLC

(57) ABSTRACT

A hydraulic shimmy damper that resolves drawbacks in several known shimmy dampers, such as damping characteristics that are dependent on oil temperature variations. The disclosed shimmy damper includes a hydraulic compensator (40) having an internal fluid volume that is significantly more important than a fluid volume expelled from the body of the shimmy damper when its piston moves fore and aft. The shimmy damper also includes a hydraulic manifold (30) arranged between the body and the hydraulic compensator and defining a transfer channel between chambers in the piston that is connected to the hydraulic compensator. The manifold receives interchangeable hydraulic cartridge-type valves (CV1,RV1; CV2,RV2) for metering the fluid flowing from the chambers to the transfer channel, and allows the fluid to freely enter the chambers from the transfer channel. The present shimmy damper is therefore much less sensitive to oil temperature variation under intense shimmy.

4 Claims, 3 Drawing Sheets

40 RV1 CV1 CV2 RV2 H1 30 H2 21 17 19 15 X X 23 16 20 14 12 22 13 18 10 C1 11 C2

(56) References Cited

U.S. PATENT DOCUMENTS

2003/0010587 A1* 1/2003 Eroshenko .................... 188/314
2003/0034079 A1* 2/2003 Lee ................................. 138/31
2004/0134730 A1* 7/2004 Forster .......................... 188/314
2006/0102440 A1* 5/2006 Nygren et al. ................ 188/314
2006/0151270 A1* 7/2006 Sakai et al. ................... 188/313
2006/0249340 A1* 11/2006 Love .......................... 188/266.2
2009/0277734 A1* 11/2009 Cox et al. ...................... 188/285

* cited by examiner

HYDRAULIC SHIMMY DAMPER FOR AIRCRAFT LANDING GEAR

CROSS REFERENCE TO RELATED APPLICATIONS

This application is a National Stage of International Application No. PCT/CA2011/050464 filed Jul. 28, 2011, claiming priority based on Canadian Patent Application No. 2 711 199 filed Jul. 29, 2010, the contents of all of which are incorporated herein by reference in their entirety.

This invention relates to shimmy dampers, in particular those shimmy dampers used on aircraft landing gears to damp gear vibrations.

PRIOR ART

Shimmy is a complex oscillatory phenomenon affecting some aircraft landing gears to such a level that the gear stability may be jeopardized. It has been a long aeronautic industry practice to equip landing gears with shimmy dampers to prevent vibrations evolving in a divergent way. Such a shimmy damper is illustrated in U.S. Pat. No. 5,224,668.

In several aircraft incidents, some very known shimmy dampers have been identified as unable to damp shimmy phenomenon. Those shimmy dampers were thought to suffer from at least one of the following drawbacks:

- very low damping coefficient, based on small hydraulic restrictions, because incorporation of higher restrictions would have required to protect the restricted orifice by a screen, which may be difficult to integrate in the known designs;
- the hydraulic restriction suffers from important geometric tolerance, because it is often provided with simple drilled holes as opposed to a precise calibrated hole;
- the hydraulic restriction suffers from important oil temperature variations;
- the anti-cavitation valves are often custom made, which make them hard to change if a high frequency response is required after tests;
- the hydraulic chamber oil volume is small, and the oil quickly gets heated under intense shimmy, diminishing the damping capacity.
- the hydraulic compensator is threaded into shimmy damper body, making a weak mechanical connection that may fail under vibration fatigue, like in previous incidents.

OBJECT OF THE INVENTION

An object of the invention is to provide a shimmy damper that is cavitation free, offering damping characteristics depending very little on oil temperature, and easy to tune.

BRIEF DESCRIPTION OF THE INVENTION

According to the invention, there is provided a hydraulic shimmy damper including:

- a hollow body having an inner cylindrical surface and two end walls defining an inner functional volume;
- a piston having a piston head sealingly engaging said inner cylindrical surface so as to define two hydraulic active chambers within the functional volume, said piston having a rod projecting from said piston head, which sealingly traverses one of said end walls;
- biasing means to bias said piston relative to said body towards a rest position so as to allow for fore and aft motion of the piston around said rest position under action of external forces;
- a hydraulic compensator having an internal fluid volume that is significantly more important that a fluid volume expelled from the body when the piston moves fore and aft;
- a hydraulic manifold arranged between said body and said hydraulic compensator and defining a transfer channel between said chambers that is connected to said hydraulic compensator and further receiving interchangeable hydraulic cartridge-type valves for metering the fluid flowing from said chambers to said transfer channel, and allowing the fluid to freely enter said chambers from said transfer channel.

Said hydraulic cartridge-type valves have internal screens to protect them from big particle contaminants.

Thanks to the important volume of the compensator, the metered fluid expelled from the body generates only marginal temperature elevation of the total oil volume contained within the shimmy damper. This makes the shimmy damper of the invention much less sensitive to oil temperature variation under intense shimmy.

Furthermore, the use of standard hydraulic cartridge-type valves makes it easy to change said valves to tune the metering characteristics of the shimmy damper. The shimmy damper of the invention can be very easily adapted to various landing gears, and may be modified during the life of the landing gear to account for shimmy characteristics changes of the landing gear due to ageing and wear.

BRIEF DESCRIPTION OF THE FIGURES

The invention will be further understood in the light of the detailed description of one particular embodiment of the invention, with reference to the following figures.

DETAILED DESCRIPTION OF ONE EMBODIMENT OF THE INVENTION

Figure 1:
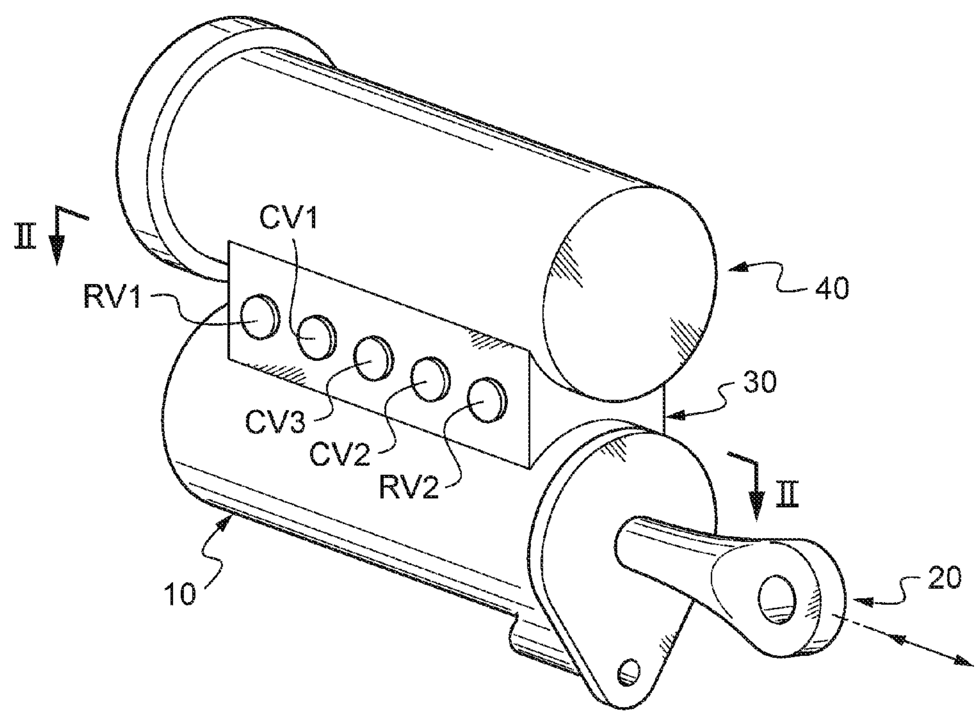
FIG. 1 is a perspective view of a shimmy damper according to one embodiment of the invention.

With reference to FIG. 1, the hydraulic shimmy damper comprises a body 10 in which a piston 20 is engaged for translational motion along a longitudinal axis X. Said body 10 is attached to a hydraulic manifold 30, which in turn is attached to a hydraulic compensator 40. The shimmy damper is to be installed at a joint between two relatively oscillating components of the landing gear, one component being affixed to said body 10 while the other component is affixed to said piston 20. As an example, the shimmy damper may be installed between the torque links extending between the gear cylinder and the gear piston.

Figure 2:
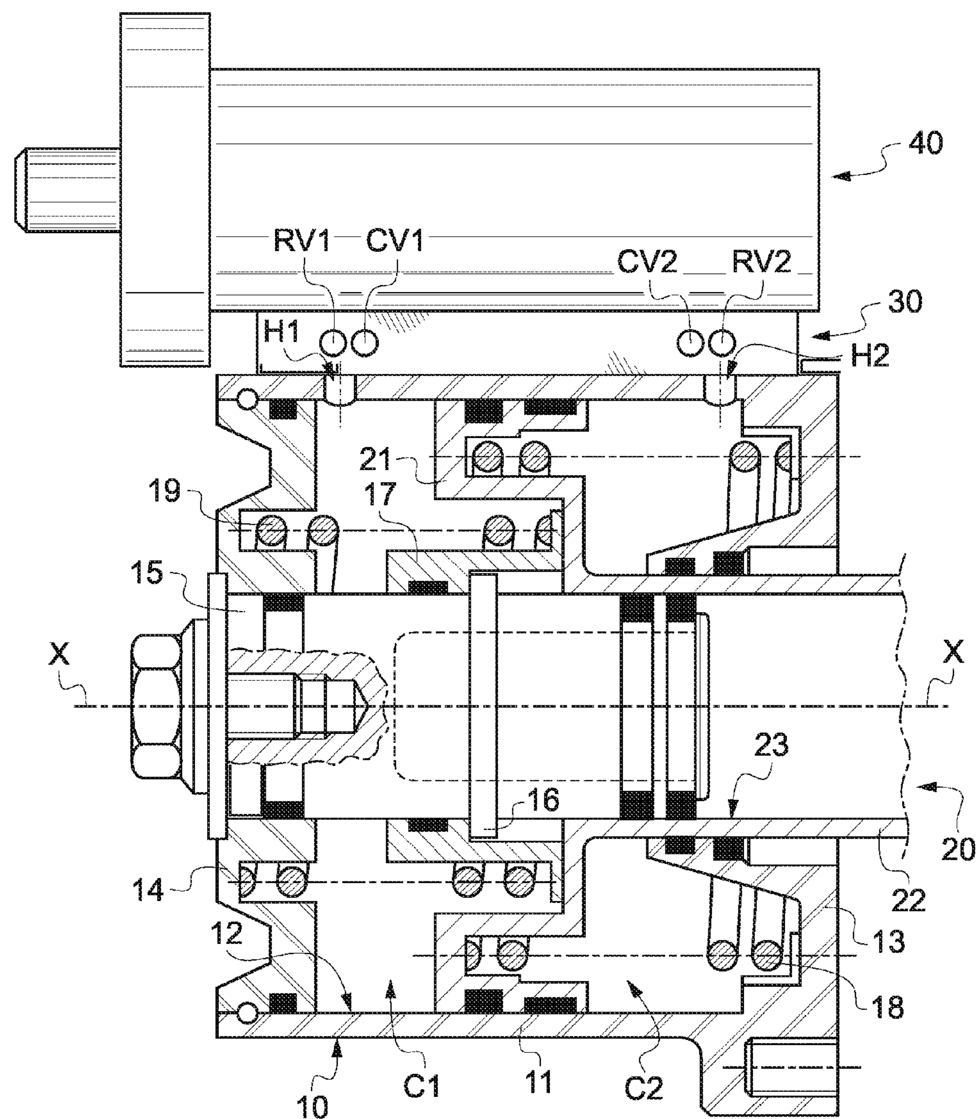
FIG. 2 is a partial sectional view along line II-II of FIG. 1.

With reference to FIG. 2, said body 10 comprises a hollow cylinder 11 having an inner cylindrical surface 12 and a first end wall 13. Said cylinder 11 is closed at the opposite side thereof by a second end wall 14 so as to define an internal functional volume. Said piston 20 has a piston head 21 that sealingly engages said inner cylindrical surface 12 to define two hydraulic chambers C1 and C2 within said functional volume. Said piston 20 also encompasses a rod 22 that protrudes from said piston head 21 and sealingly traverses said first end wall 13.

While not shown here, said body 10 and said piston 20 have respective end fixtures for being affixed to the relatively oscillating components of the landing gear.

Said piston 20 is hollow and a plunger 15 affixed to said second end wall 14 extends so as to sealingly engage an inner surface 23 of said piston 20. Said plunger 15 has a circumferential protrusion forming a stop 16 for a sleeve or spring carrier 17 mounted for sealingly sliding around said plunger 15. A first spring 18 extends between said first end wall 13 and said piston head 21 to urge said piston head towards said spring carrier 17. A second spring 19 extends between said second end wall 14 and said spring carrier 17 to urge said spring carrier 17 towards said piston head 21. As a result, said piston head 21 and said spring carrier 17 are urged against one another. Action of hydraulic pressure on both sides of said piston head 21 and action of said springs 18,19 results in said spring carrier 17 being abutted against said stop 16 while said piston head 21 abuts against said spring carrier 17, thus defining a rest, central position of said piston 20 relative to said body 10, as illustrated in FIG. 2. Said piston 20 is free to move fore and aft along longitudinal axis X around said rest position whenever an external force is sufficient to overcome the pressure and springs efforts. It will be observed that in said rest position, there is some available displacement between said piston head 21 and said stop 16 so as to allow for motion of said piston 20 in direction of said stop 16.

Figure 3:
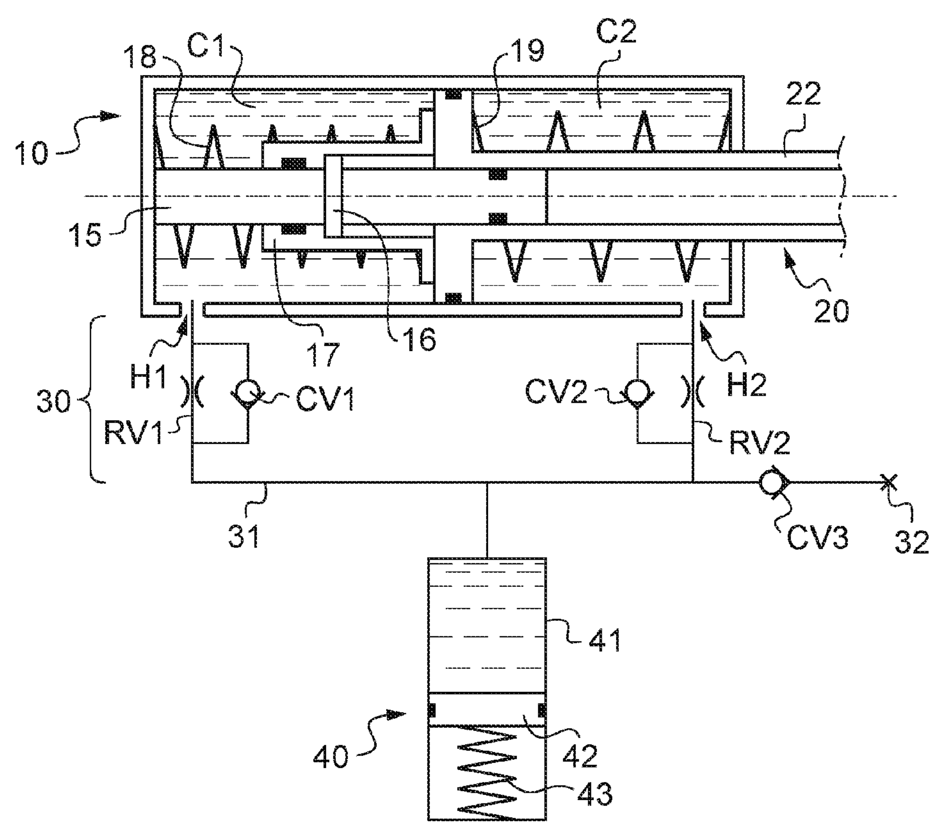
FIG. 3 is a hydraulic diagram of the shimmy damper of FIG. 1.

As best seen on FIG. 3, said body 10 is in fluidic communication with a manifold 30 by means of communication holes H1,H2. Said manifold 30 defines a channel between the two chambers C1 and C2 through holes H1 and H2, as hereafter explained. In FIG. 3, like elements have like references, though symbolically pictured.

One recognizes said body 10 and said piston 20. One also recognizes said hydraulic compensator 40 that comprises a housing 41 in which a piston 42 biased by a spring 43 is sealingly sliding into the housing for maintaining a positive pressure throughout the shimmy damper, so that no cavitation is to be experienced. Said spring 43 may be a mechanical spring, as pictured, or a much lighter gas spring. Said compensator 40 has an internal volume that is significantly more important than a volume expelled from the chambers C1, C2 during motion of said piston 20.

Between said body 10 and said compensator 40 extends said hydraulic manifold 30 which defines a transfer channel 31 extending between said holes H1 and H2 to put said chambers C1, C2 and said compensator 40 into fluidic communication. At the outlet of each hole H1, H2, said manifold 30 encompasses a parallel combination of a check valve and a restriction valve (respectively CV1,RV1 and CV2,RV2) arranged so that fluid expelled from one chamber is forced to flow through the corresponding restriction valve as associated check valve is urged into a no-flow state, and fluid entering into another one chamber flows through the check valve as the check valve is urged into a flow state.

Thus, when said piston 20 moves one direction, it causes the volume of one of the chambers to diminish, therefore causing fluid to be expelled from that chamber into said transfer channel 31 against pressure maintained by said compensator 40, whereas the volume of the other chamber is increased, causing fluid to enter that chamber by virtue of positive pressure maintained by said compensator 40 into said transfer channel 31. Fluid expelled from one chamber is metered by the corresponding restriction valve, while fluid entering in the other chamber encounters only a marginal resistance, as the flow section of the check valve in the flow state is large. Any differential flow between the expelled fluid and the entering fluid is absorbed by said compensator 40.

It will be easily understood that when said body 10 and said piston 20 enter a relative fore and aft periodic motion under external forces, fluid is expelled from one of said chambers and therefore metered twice per period, generating damping of that periodic motion.

Also, said springs 18,19 define a spring rate by which the shimmy damper opposes resistance to external forces that is proportional to the amount of displacement of said piston 20 with respect to said body 10. It should be observed that in the illustrated embodiment, said spring rate has distinct values when said piston 20 is moving in one direction or the other with respect to said body 10.

Said valves CV1,CV2,RV1,RV2 are standard cartridge-type hydraulic valves and can easily be changed if needed for fine tuning of the shimmy damper.

Said manifold 30 is provided with a supplementary check valve CV3 to connect said transfer channel 31 to a feed port 32 that allows for feeding the shimmy damper with oil if needed.

This invention is not limited to what has been detailed hereinbefore, but encompasses any variant falling within the ambit of the claims.

In particular, although it is preferred that said body and said compensator be affixed in a removable manner to said manifold, said manifold may be built as a unit with said body, still being adapted to receive standard cartridge-type valves.

The invention claimed is:

1. A hydraulic shimmy damper including:

a hollow body (10) having an inner cylindrical surface and two end walls (13,14) defining an inner functional volume;

a piston (20) having a piston head (21) sealingly engaging said inner cylindrical surface so as to define two hydraulic active chambers (C1,C2) within the functional volume, said piston having a rod (22) projecting from said piston head which sealingly traverses one of said end walls;

biasing means (16,17,18,19) to bias said piston relative to said body towards a rest position so as to allow for fore and aft motion of the piston around said rest position under action of external forces;

a hydraulic compensator (40) having an internal fluid volume that is greater than a fluid volume expelled from the body when the piston moves fore and aft;

a hydraulic manifold (30) arranged between said body and said hydraulic compensator and defining a transfer channel (31) between said chambers that is connected to said hydraulic compensator, said manifold further receiving interchangeable hydraulic cartridge-type valves (CV1, RV1; CV2,RV2) for metering the fluid flowing from said chambers to said transfer channel, and allowing the fluid to freely enter said chambers from said transfer channel; wherein the biasing means further include:

a plunger (15) projecting from another of said end walls for sealingly engaging an internal cylindrical surface of said piston, said plunger having a circumferential protrusion (16);

a spring carrier (17) sliding around said plunger; said circumferential protrusion of said plunger forming a stop for said spring carrier and said piston (20);

first spring means (18) extending between said body and said piston to urge said piston towards said spring carrier (17);

second spring means (19) extending between said body and said spring carrier to urge said spring carrier towards said stop;

said first and second spring means (18,19) being so adapted as to bias said piston (20) towards said rest position in which said spring carrier (17) abuts against said stop and said piston abuts against said spring carrier.

2. The hydraulic shimmy damper as set in claim 1, in which the spring carrier (17) is sealingly sliding around said plunger.

3. The hydraulic shimmy damper as set in claim 1, in which said hydraulic cartridge-type valves include a check valve (CV1; CV2) and a restriction valve (RV1; RV2) arranged in a parallel manner at each fluidic connection of said manifold with said chambers.

4. The hydraulic shimmy damper as set in claim 1, in which said manifold further includes a supplementary check valve (CV3) arranged between said transfer channel (31) and a feed port (32).

* * * * *